(12) United States Patent
Veldman et al.

(10) Patent No.: US 9,717,121 B2
(45) Date of Patent: Jul. 25, 2017

(54) LIGHTING DEVICE SUITABLE FOR MULTIPLE VOLTAGE SOURCES

(71) Applicant: PHILIPS LIGHTING HOLDING B.V., Eindhoven (NL)

(72) Inventors: Paul Robert Veldman, Oss (NL); Patrick Alouisius Martina De Bruycker, Nuenen (NL); Sait I Zmit, Utrecht (NL); Yi Wang, Delft (NL); Kumar Arulandu, Breda (NL); Dennis Claessens, Eindhoven (NL); Philip Louis Zulma Vael, Temse (BE)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 14/434,787

(22) PCT Filed: Apr. 15, 2014

(86) PCT No.: PCT/EP2014/057559
§ 371 (c)(1),
(2) Date: Apr. 10, 2015

(87) PCT Pub. No.: WO2014/173723
PCT Pub. Date: Oct. 30, 2014

(65) Prior Publication Data
US 2015/0250033 A1    Sep. 3, 2015

(30) Foreign Application Priority Data

Apr. 26, 2013 (EP) .................................... 13165485

(51) Int. Cl.
*H05B 33/08* (2006.01)

(52) U.S. Cl.
CPC ........ *H05B 33/0809* (2013.01); *Y02B 20/342* (2013.01)

(58) Field of Classification Search
CPC .... H05B 37/00; H05B 33/08; H05B 33/0809; H05B 33/0815; H05B 41/28; H02M 7/10; H02M 7/06; H02M 7/103
(Continued)

(56) References Cited

U.S. PATENT DOCUMENTS 6,272,032 B1    8/2001  Franck
6,316,883 B1 *  11/2001 Cho ........................ H05B 41/28
                                                   315/209 R
(Continued)

FOREIGN PATENT DOCUMENTS

DE        19604026 A1    8/1997
GB        2454217 A      5/2009
(Continued)

*Primary Examiner* — Thai Pham

(57) ABSTRACT

A lighting device is configured to receive a first voltage signal, and includes: a first circuit coupled to input terminals for receiving the first voltage signal, the first circuit including: rectifying diodes for rectifying the first voltage signal and supplying a second voltage signal, a first capacitor for buffering the second voltage signal, and a second capacitor coupled in parallel to one of the rectifying diodes of the first circuit; a second circuit receiving an input voltage signal, corresponding to the second voltage signal, and converting the input voltage into an output signal; and a light circuit receiving the output signal of the second circuit and including at least one light emitting diode, wherein the first circuit includes a fourth circuit in parallel to the second capacitor, the fourth circuit including at least two fourth circuit diodes and being connected by a fourth capacitor to one of the input terminals.

20 Claims, 9 Drawing Sheets

(58) Field of Classification Search
USPC ........ 315/185 R, 192, 200 R, 201, 291, 294, 315/307, 308; 363/37, 44, 45, 52, 125, 363/126, 132
See application file for complete search history.

(56) References Cited

U.S. PATENT DOCUMENTS

| | | | |
|---|---|---|---|
| 8,004,210 B2 | 8/2011 | Harmgardt et al. | |
| 8,368,314 B2* | 2/2013 | Chen | H02M 1/425 315/224 |
| 8,461,770 B2* | 6/2013 | Ye | H05B 33/0809 315/186 |
| 8,482,214 B2* | 7/2013 | Hui | H05B 33/0809 315/201 |
| 2003/0071582 A1* | 4/2003 | Zhang | H05B 41/28 315/247 |
| 2004/0189555 A1* | 9/2004 | Capen | H05B 33/0815 345/82 |
| 2005/0057210 A1* | 3/2005 | Ueda | H02M 5/458 318/801 |
| 2008/0252229 A1* | 10/2008 | Wu | H05B 33/0803 315/227 R |
| 2010/0148694 A1* | 6/2010 | Chang | H05B 33/0809 315/294 |
| 2013/0063043 A1* | 3/2013 | Daniel | H05B 33/0809 315/294 |
| 2013/0187561 A1* | 7/2013 | Franck | H05B 33/0815 315/201 |
| 2014/0159648 A1* | 6/2014 | Sadwick | H02M 1/4266 320/107 |
| 2014/0225552 A1* | 8/2014 | Shinomoto | H02M 1/4208 318/504 |
| 2014/0265895 A1* | 9/2014 | Ekbote | H02M 1/126 315/200 R |
| 2015/0373794 A1* | 12/2015 | Li | H05B 37/02 315/200 R |

FOREIGN PATENT DOCUMENTS

| | | |
|---|---|---|
| JP | 1098881 A | 4/1998 |
| JP | 2010273503 A | 12/2012 |

* cited by examiner

LIGHTING DEVICE SUITABLE FOR MULTIPLE VOLTAGE SOURCES

CROSS-REFERENCE TO PRIOR APPLICATIONS

This application is the U.S. National Phase application under 35 U.S.C. §371 of International Application No. PCT/EP2014/057559, filed on Apr. 15, 2014, which claims the benefit of or European Patent Application No. 13165485.7, filed on Apr. 26, 2013. These applications are hereby incorporated by reference herein.

FIELD OF THE INVENTION

The invention relates to a lighting device for multiple voltage sources. The invention further relates to a circuit and an apparatuses for application in such lighting device.

BACKGROUND OF THE INVENTION

U.S. Pat. No. 8,004,210 B2 relates to a light emitting diode replacement for low voltage lamps and discloses a rectifier circuit in the form of a diode bridge.

Usually, a transformer is applied for feeding a low-voltage lamp, such as a halogen lamp. The transformer is in general connected to AC mains voltage. When replacing the low-voltage lamp by a lighting device comprising one or more light emitting diodes, without replacing the transformer, problems may occur owing to the fact that the lighting device may exhibit behavior different from that of the low-voltage lamp. The one or more light emitting diodes exhibit a voltage-current behavior different from that of low-voltage lamps. Moreover, there are many transformers and other voltage sources, each having specific characteristics and specifications. The lighting devices should function with most of these voltage sources. In general, in advance, it is impossible to determine with which voltage source a retrofit lighting devices will have to function. Further, in particular electronic transformers require a minimum load to sustain high frequency oscillation. In combination with certain transformers and other voltage sources, this may result in suboptimal behavior of the lighting device, such as flickering. In particular the frequency of the voltage supplied by different voltage sources may greatly vary.

DE19604026 A1 discloses a circuit with a rectifier and a capacitor parallel to the rectifier. The capacitor receives a voltage signal from the rectifier. Parallel to two diodes of the rectifier second and third capacitors are provided to increase the voltage.

U.S. Pat. No. 6,272,032 B1 discloses a rectifier with a parallel capacitor. In addition, polarity-reversal capacitors are provided in parallel to the diodes of the rectifier.

Also GB2454217 A discloses a rectifier circuit comprising diodes. In parallel to at least one of the diodes a capacitor is provided.

SUMMARY OF THE INVENTION

It is an object of the invention to provide an improved lighting device suitable for application in combination with multiple voltage sources, in particular multiple transformers. Further objects of the invention are to provide a circuit and an apparatus to be applied in a lighting device.

According to a first aspect, a lighting device suitable for multiple voltage sources, which voltage sources provide a first voltage signal, comprises:

a first circuit coupled to input terminals, for receiving the first voltage signal from the voltage source, the first circuit comprising diodes for rectifying the first voltage signal and supplying a second voltage signal, a first capacitor for buffering the second voltage signal and a second capacitor coupled in parallel to one of the diodes of the first circuit, a second circuit receiving an input voltage signal, corresponding with the second voltage signal, and converting the input voltage into an output signal, a light circuit receiving the output signal of the second converter and comprising at least one light emitting diode, and the first circuit comprising a fourth circuit provided parallel to the second capacitor, the fourth circuit comprising at least two diodes and being connected by a fourth capacitor to an input terminal.

A diode circuit rectifies a first voltage signal coming from a voltage source, such as for example a transformer or another voltage-to-voltage converter, and provides a second voltage signal to a first capacitor. The first capacitor buffers the second voltage signal and offers a buffered second voltage signal to a second circuit, such as for example a voltage-to-current converter, for feeding a light circuit comprising at least one light emitting diode. By having introduced a second capacitor, which is coupled in parallel to (exactly) one of the diodes of the diode circuit, the first circuit becomes able to extract load current from the voltage source and to transfer energy from the voltage source to the input of the second circuit even when the amplitude of the first voltage signal of the voltage source is smaller than the magnitude of the second voltage signal buffered by the first capacitor. This may be defined as a charge-pump effect. In particular when the voltage source is an electronic transformer, it is now possible to satisfy the minimum load requirement of the electronic transformer over an extended range of amplitudes of the first voltage signal of the electronic transformer. More specifically, from the start of oscillation of the electronic transformer, following zero-crossing of the mains voltage supplying the electronic transformer, up to and beyond the point where the amplitude of the output voltage of the electronic transformer reaches its peak value, which is around the peak of the mains voltage supplying the electronic transformer. The reason for this is that the second capacitor, during a first part of a switching cycle of the first voltage signal, is charged with energy, and that the second capacitor, during a second part of the switching cycle of the first voltage signal, tries to hold this energy. The first circuit, according to the invention provided with a fourth circuit, acts as a voltage quadrupler with rectification. This configuration enables the electronic transformer to oscillate sustainable at a lower voltage level, shorter after zero crossing (at approximately 25% of the peak voltage). The efficiency and the overall behavior of the lighting device are improved.

Each diode may be a real diode or a Zener diode or a Schottky diode or may be (a part of) a transistor or may be created otherwise as long as it exhibits diode behavior. The diode circuit may be a diode bridge or may be created otherwise as long as it exhibits rectifier behavior. The first voltage signal is for example an alternating-current (AC) voltage signal, and the second voltage signal is for example a direct-current (DC) voltage signal.

An embodiment of the lighting device is defined by a first input terminal of the input terminals being coupled via a first diode to a first output terminal of the output terminals and via a second diode to a second output terminal of the output terminals, and a second input terminal of the input terminals being coupled via a third diode to the first output terminal and via a fourth diode to the second output terminal, one of said diodes being the first diode.

An embodiment of the rectifier circuit is defined in that it further comprises a third capacitor coupled in parallel to another one of the diodes. The third capacitor will strengthen the charge-pump effect.

An embodiment of the lighting device is defined by a first input terminal of the input terminals being coupled via a first diode to a first output terminal of the output terminals and via a second diode to a second output terminal of the output terminals, and a second input terminal of the input terminals being coupled via a third diode to the first output terminal and via a fourth diode to the second output terminal, one of said diodes being the first diode, and another of the diodes being the second diode. This diode circuit is a diode bridge.

An embodiment of the lighting device is defined by the second and/or the third capacitor being in series with a series diode and a conductive path comprising a diode between an input terminal and a node between the second capacitor or the third capacitor and the series diode thereof.

An embodiment of the lighting device is defined by comprising a fourth circuit provided parallel to the second capacitor or the third capacitor, the fourth circuit comprising at least two diodes and being connected by a fourth capacitor to input terminals.

An embodiment of the lighting device is defined by a fifth circuit provided parallel to the second capacitor or the third capacitor, the fifth circuit comprising at least two diodes and being connected by a fifth capacitor to input terminals.

An embodiment of the lighting device is defined by the fourth circuit provided parallel to the second capacitor and the fifth circuit provided parallel to the third capacitor.

An embodiment of the lighting device is defined by the first circuit further comprising a third circuit for improving the compatibility to the voltage source.

An embodiment of the lighting device is defined by the buffered second voltage being equal or smaller than 130% of the peak value of the first voltage signal.

An embodiment of the lighting device is defined by being suitable for application with multiple voltage sources providing first voltage signals within a frequency range, with the sum of the capacitances of the capacitors of the first circuit, the capacitance of the first capacitor not included, being approximately equal to or smaller than the output power of the light circuit multiplied by a constant value (CV) and divided by the multiplication of the peak value of the first voltage signal and the maximum first voltage signal application frequency.

An embodiment of the lighting device is defined by the constant value (CV) being selected in the range of 0.001 to 0.100, preferably in the range of 0.003 to 0.03 and most preferably being approximately 0.01.

According to a second aspect, a first circuit is provided suitable for application in a lighting device.

According to a third aspect, an apparatus is provided, comprising the first circuit and the second circuit, suitable for application in a lighting device.

An embodiment of the apparatus is defined by the second circuit being a converter for converting an input DC voltage signal into an output DC signal, and the input DC voltage signal corresponding with the buffered second voltage signal.

An embodiment of the first apparatus is defined by the output DC signal being an output DC current signal destined for a light circuit comprising at least one light emitting diode, the second converter being designed to measure an amplitude of the output DC current signal for control purposes.

An insight could be that a light circuit comprising one or more light emitting diodes may exhibit behavior different from that of a low-voltage lamp such as a halogen lamp. A basic idea could be that the charge-pump capacitors (second and further capacitors) coupled in parallel to one of the diodes of a diode circuit enable to extract load current from the voltage source and to transfer energy from the voltage source to the input of the second circuit even when the amplitude of the first voltage signal of the voltage source is smaller than the magnitude of the second voltage signal buffered by the first capacitor. The lighting device of the invention, provided with a buffer capacitor and one or more charge-pump capacitors, is suitable for application with multiple voltage sources, in particular voltage sources with mutual different frequencies and/or amplitudes of the supplied first voltage signal. The lighting device is in particular also suitable for application in combination with electronic transformers. Dependent on the specific configuration of the lighting device (one, two, three or four charge-pump capacitors), already at a relatively low voltage amplitude, sufficient load will be drawn from the electronic transformer for sustained oscillation. The electronic transformer may for instance start at 25% or 50% of the peak voltage amplitude.

The problem of providing an improved lighting device has been solved. A further advantage could be that an inrush current signal coming from the first circuit may be limited by the charge-pump capacitors (second and further capacitors) and that the solution of adding charge-pump capacitors is more economical and more robust, compared to another solutions that add a power modulation stage between the diode circuit and the buffer capacitor (first capacitor).

Moreover, having the accumulated capacitance of the several chare-pump capacitors in a proper relation to the output power of the lighting device and the characteristics of a range of voltage sources, defined by their amplitude and their frequency of the voltage signal, this will optimize the charge-pump effect, will prevent substantial overboosting of the buffer capacitor and will achieve that an electronic transformer will start and sustain oscillation soon after zero-crossing.

These and other aspects of the invention will be apparent from and elucidated with reference to the embodiments described hereinafter.

DETAILED DESCRIPTION OF EMBODIMENTS

Figure 1:
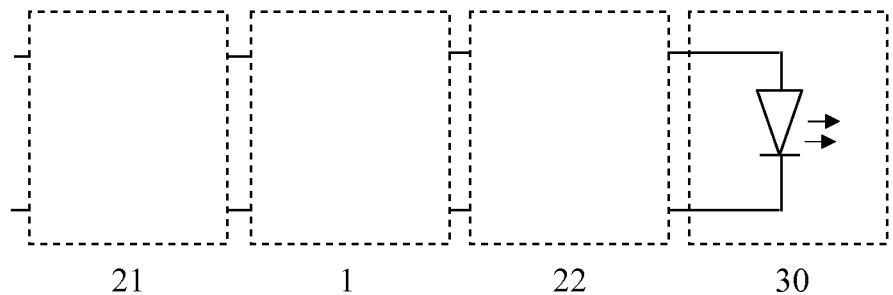
FIG. 1 shows an overview of circuits.

In FIG. 1, an overview of circuits is shown. A voltage source 21, for example, a voltage-to-voltage converter such as a magnetic transformer or an electronic transformer, such as a switched-mode power-supply, or fluorescent ballast is coupled to a first circuit 1. The first circuit 1 is further coupled to a second circuit 22 such as a voltage-to-current converter. The second circuit 22 is further coupled to a light circuit 30 comprising at least one light emitting diode of any kind, usually more than one light emitting diode in any combination. The second circuit 22 may alternatively be a voltage-to-voltage-converter.

Figure 2:
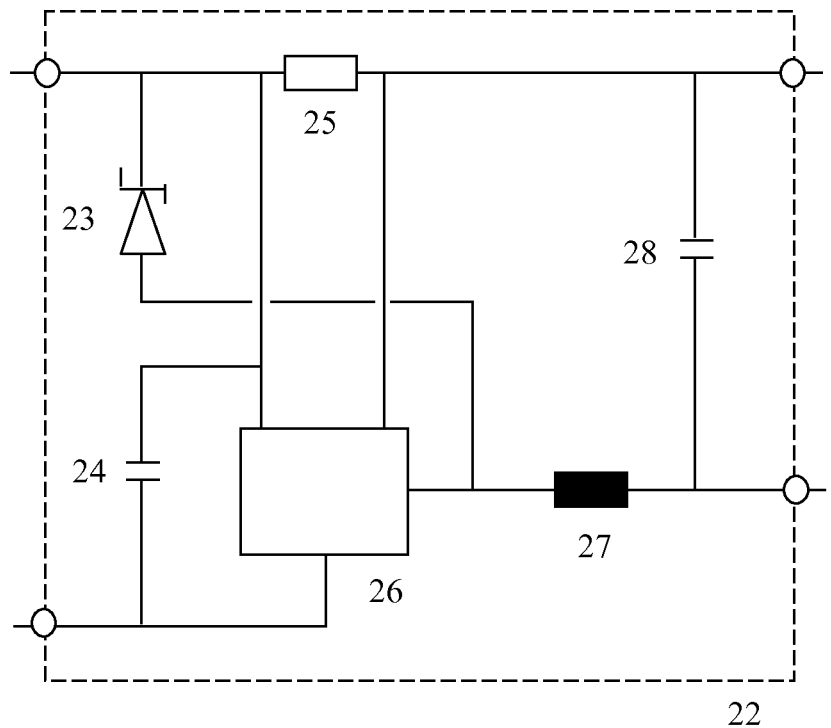
FIG. 2 shows an embodiment of a second circuit.

In FIG. 2, an embodiment of a second circuit 22 is shown. A first input terminal is coupled to a normal input of a chip 26 and to a first side or a Zener diode 23 and to a first side of a resistor 25 and to a first side of a capacitor 24. Another side of the resistor 25 is coupled to a first output terminal and to a sensing input of the chip 26. A second input terminal is coupled to a ground input of the chip 26 and to another side of the capacitor 24. Another side of the Zener diode 23 is coupled to an output of the chip 26 and to one side of an inductor 27. Another side of the inductor 27 is coupled to a second output terminal and via a capacitor 28 to the first output terminal. This second circuit 22 is a voltage-to-current-converter. The chip 26 is a chip common in the art. The first and second input terminals of the second circuit 22 are to be coupled to output terminals of the rectifier circuit 1 shown in FIGS. 3 and 4. The first and second output terminals of the second circuit 22 are to be coupled to terminals of the light circuit 30. Many alternatives to this second circuit 22 will be available to a person skilled in the art.

Figure 3:
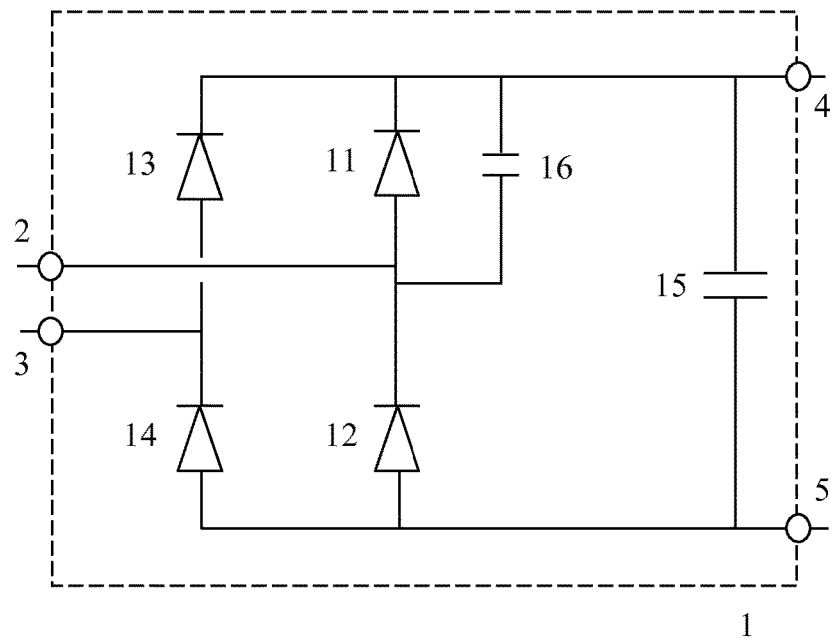
FIG. 3 shows a first embodiment of a first circuit.

In FIG. 3, a first embodiment of a first circuit 1 is shown. The first circuit 1 comprises a diode circuit coupled to input terminals 2, 3 of the first circuit 1 for receiving a first voltage signal from the voltage source 21. The diode circuit comprises diodes 11-14 for rectifying the first voltage signal and is coupled to output terminals 4, 5 of the first circuit 1 for supplying a second voltage signal. The first circuit 1 further comprises a first capacitor 15 coupled to the output terminals 4, 5 for buffering the second voltage signal and for offering a buffered second voltage signal to the second circuit 22. The first circuit 1 yet further comprises a second capacitor 16 coupled in parallel to (exactly) one of the diodes 11-14 for providing the charge-pump effect.

Preferably, a first input terminal 2 of the input terminals 2, 3 is coupled via a first diode 11 to a first output terminal 4 of the output terminals 4, 5 and via a second diode 12 to a second output terminal 5 of the output terminals 4, 5. And a second input terminal 3 of the input terminals 2, 3 is coupled via a third diode 13 to the first output terminal 4 and via a fourth diode 14 to the second output terminal 5. Said one of the diodes 11-14 may for example be the first diode 11, but any other one of the diodes 12-14 will do fine too.

Figure 4:
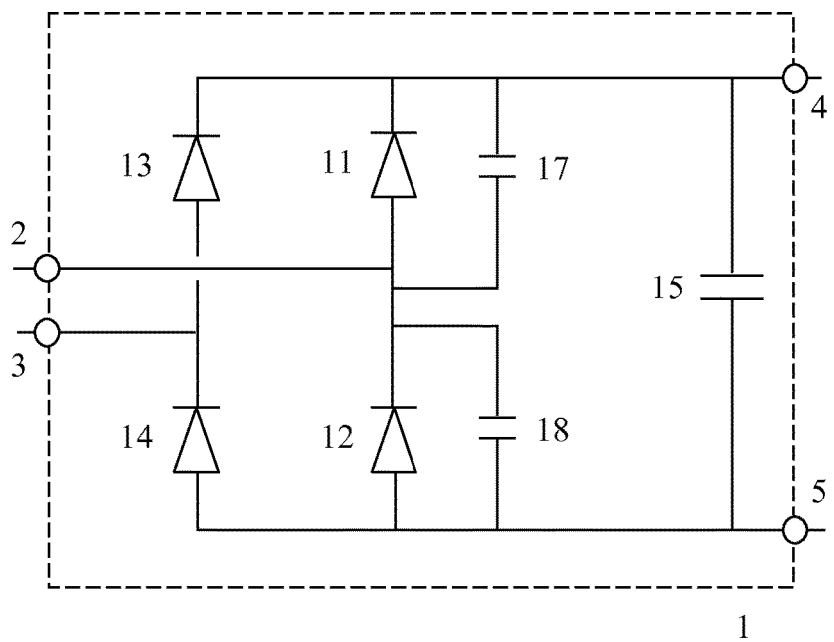
FIG. 4 shows a second embodiment of a first circuit.

In FIG. 4, a second embodiment of a rectifier circuit 1 is shown. This second embodiment only differs from the first embodiment shown in FIG. 3 in that, in addition to the second capacitor 17 that is coupled in parallel to the first diode 11, there is a third capacitor 18 that is coupled in parallel to the second diode 12 to strengthen the charge-pump effect. Good results are achieved in case the respective capacitors 17 and 18 are coupled in parallel to the respective diodes 11 and 12 or vice versa, and in case the respective capacitors 17 and 18 are coupled in parallel to the respective diodes 13 and 14 or vice versa. The first circuit of this embodiment acts as a voltage doubler with peak rectification.

Figure 5:
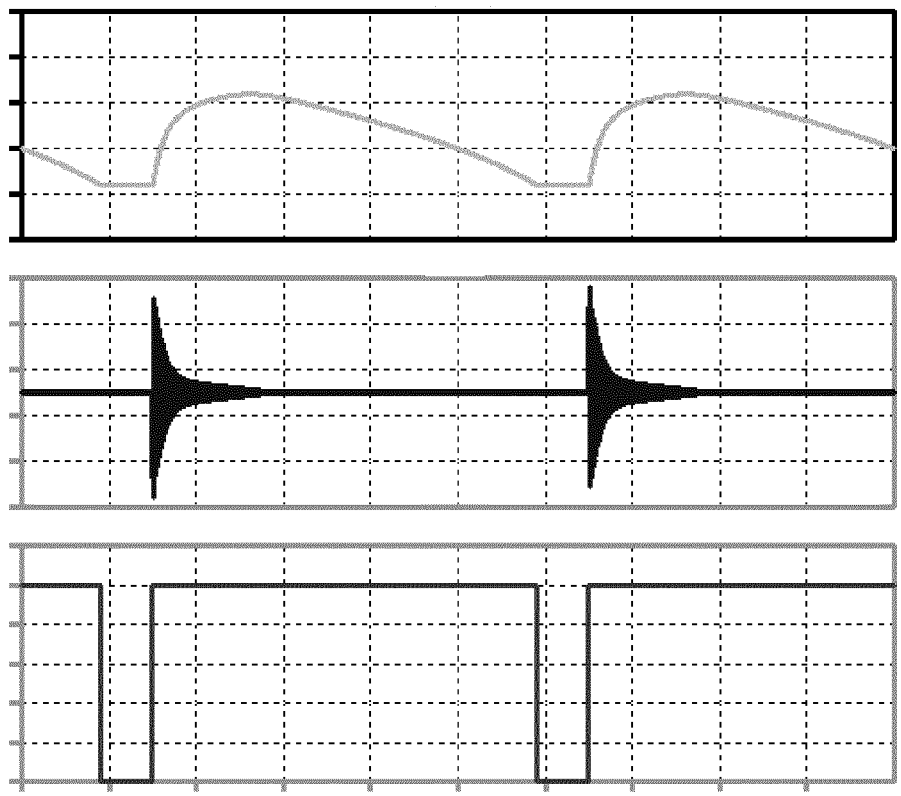
FIG. 5 shows prior art waveforms.

In FIG. 5, prior art waveforms are shown. The upper graph shows a buffered second voltage signal across the first capacitor 15 versus time. The next graph shows an input current signal flowing through the input terminals 2, 3 versus time. The lower graph shows an output current signal flowing through the light circuit 30 versus time. Clearly, the buffered second voltage signal has a relatively low average value and the input current signal has relatively short and high peaks and the output current signal is interrupted when the buffered second voltage signal has too low a value.

Figure 6:
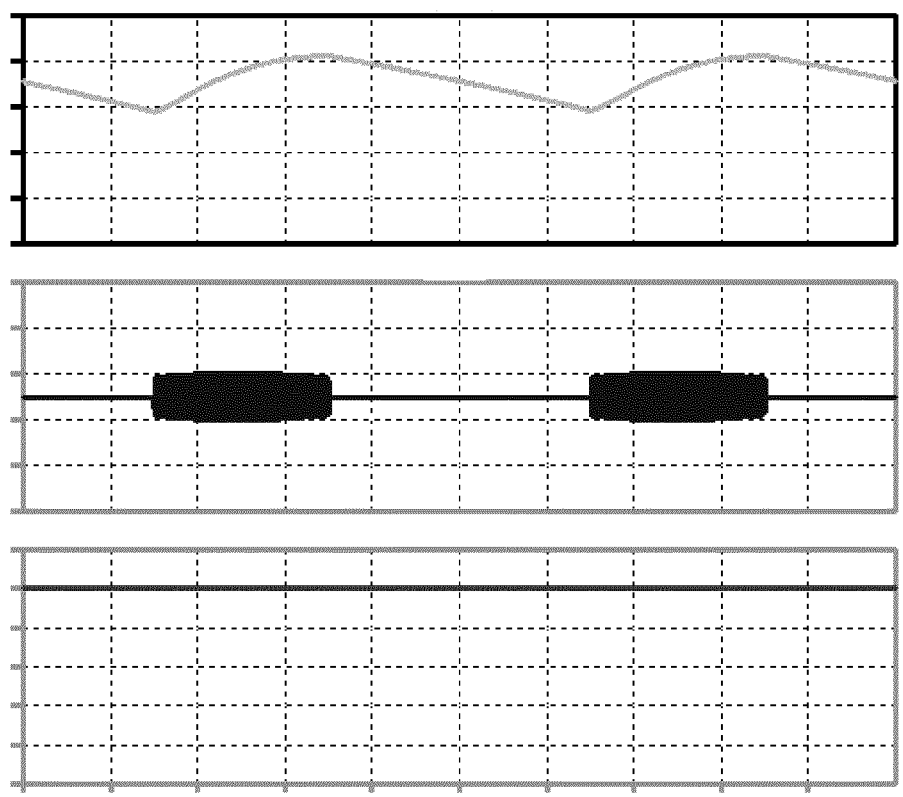
FIG. 6 shows improved waveforms.

In FIG. 6, improved waveforms are shown for the rectifier circuit as shown in FIG. 3. Again, the upper graph shows a buffered second voltage signal across the first capacitor 15 versus time. The next graph shows an input current signal flowing through the input terminals 2, 3 versus time. The lower graph shows an output current signal flowing through the light circuit 30 versus time. Clearly, the buffered second voltage signal has a relatively high average value compared to the prior art buffered second voltage signal and the input current signal is more smoothed compared to the prior art input current signal and the output current signal is no longer interrupted, which are great advantages.

The first capacitor 15 may have a value of 470 µF and the second and third capacitors 16-18 may each have a value of 22 nF but other values are not to be excluded and many other values will do fine too.

Figure 7:
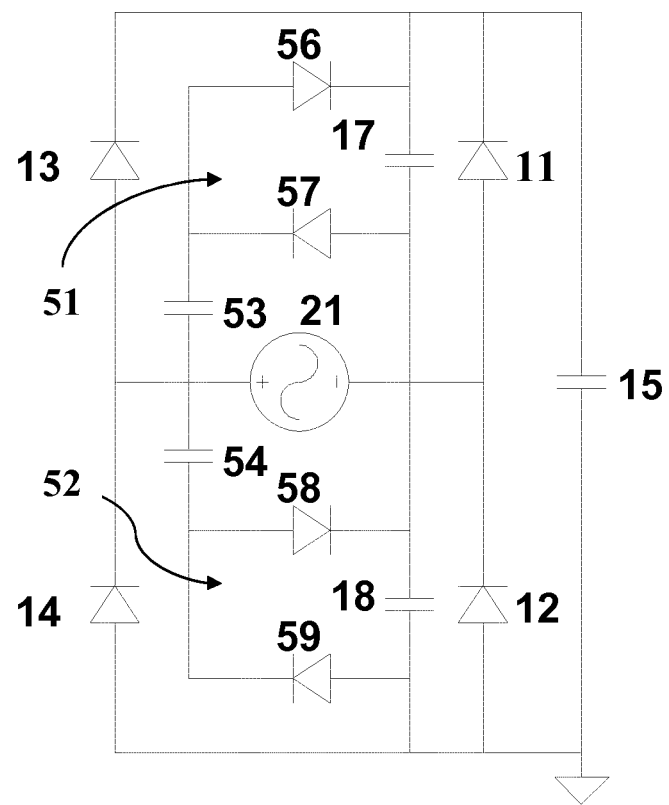
FIG. 7 shows a third embodiment of a first circuit

In FIG. 7 a third embodiment of the first circuit is shown. In addition to the second embodiment of FIG. 4, a fourth capacitor 53, a fifth capacitor 54, a fourth circuit 51 and a fifth circuit 52 are provided. The fourth capacitor 53 and the fifth capacitor 54 are positioned between the input terminals 2, 3 and the fourth circuit 51 and fifth circuit 52, respectively. The fourth circuit 51 and the fifth circuit 52 are parallel to the second capacitor 17 and the third capacitor 18, respectively, and both comprise at least two diodes (56/57 and 58/59, respectively). In this configuration the first circuit 1 acts as a voltage quadrupler with peak rectification. This configuration enables the electronic transformer to oscillate sustainably at a lower voltage level, shortly after a zero crossing (at approximately 25% of the peak voltage), which increases efficiency and improves overall behavior of the lighting device.

Figure 8:
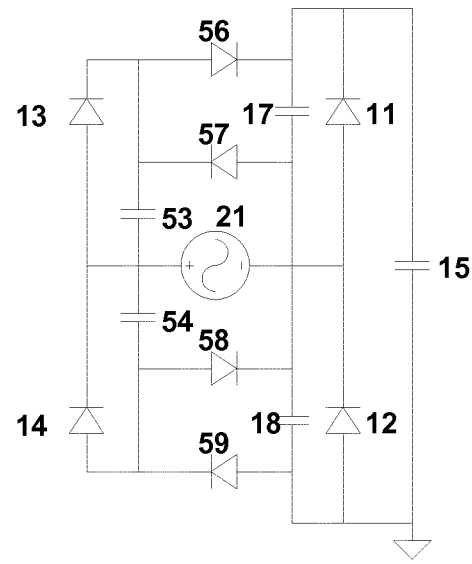
FIG. 8 shows a fourth embodiment of a first circuit

The fourth embodiment of FIG. 8 is also provides a quadrupler with peak rectification.

The third and the fourth embodiment will provide better properties than the second embodiment of the first circuit, however, will also be more expensive. The invention provides the possibility to have the first circuit customized to the desired characteristics of the lighting device, in particular also in relation to costs. Within the scope of the invention, several more or less complicated configurations, with specific characteristics, are possible, without affecting the basic functionality of the first circuit and the lighting device. In particular the number of capacitors may be selected in relation to a specific function. Several configurations are feasible within the concept of the invention. For instance with two charge-pump capacitors up to a tripler may be created, or with three charge-pump capacitors even up to a quadrupler may be created.

Figure 9:
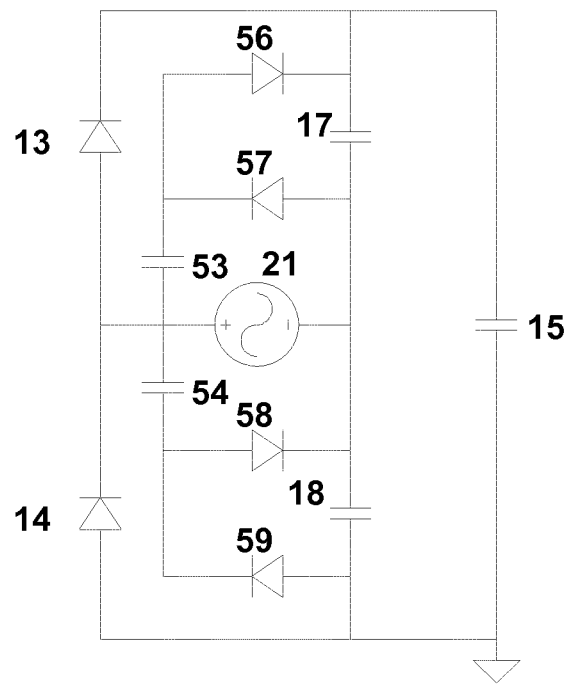
FIG. 9 shows a fifth embodiment of a first circuit

The fifth embodiment of FIG. 9 differs from the third embodiment in that the diodes 11 and 12 have been omitted.

In this configuration voltage peak rectification takes place along the diodes 56-59 and the configuration is still working as a quadrupler.

Figure 10:
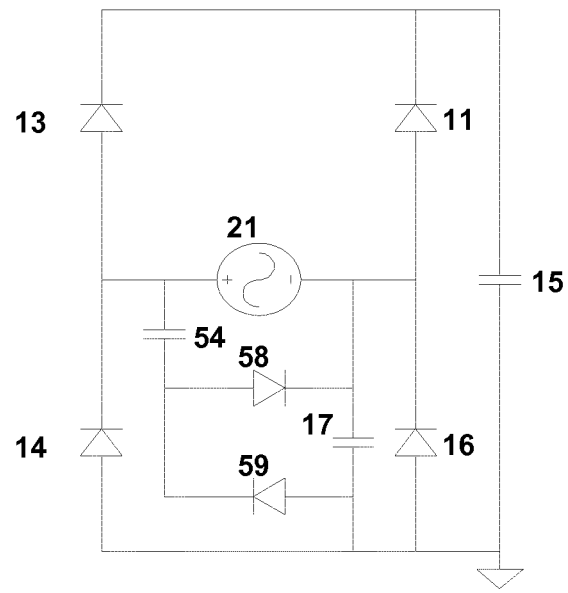
FIG. 10 shows a sixth embodiment of a first circuit

The sixth embodiment as shown in FIG. 10 acts as a voltage tripler, with two capacitors 17 and 54.

Figure 11:
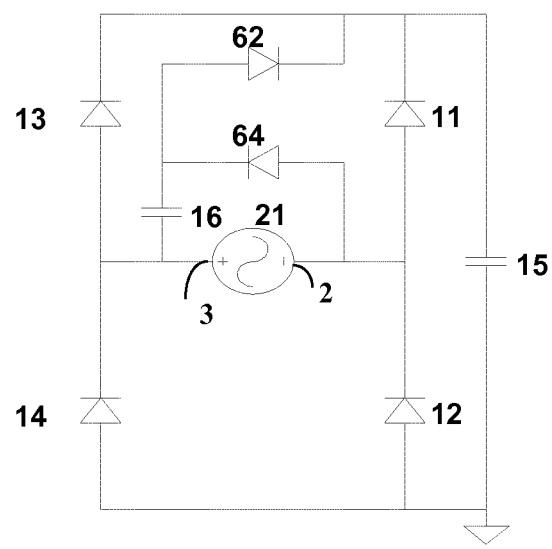
FIG. 11 shows a seventh embodiment of a first circuit.

Finally, in FIG. 11 a configuration of the first circuit is provided with just one capacitor (second capacitor 16) in parallel to diode 13. In series with the second capacitor 16 is a series diode 62. A conductive path with diode 64 is provided between input terminal 2 and a node between second capacitor 16 and series diode 62. The second capacitor 16 is charged via diode 64 to the momentary AC peak voltage. When, the polarity of the voltage source 21 inverts, via diode 12, voltage source 21, second capacitor 16 and diode 64, charge is fed to first capacitor 15.

Figure 13:
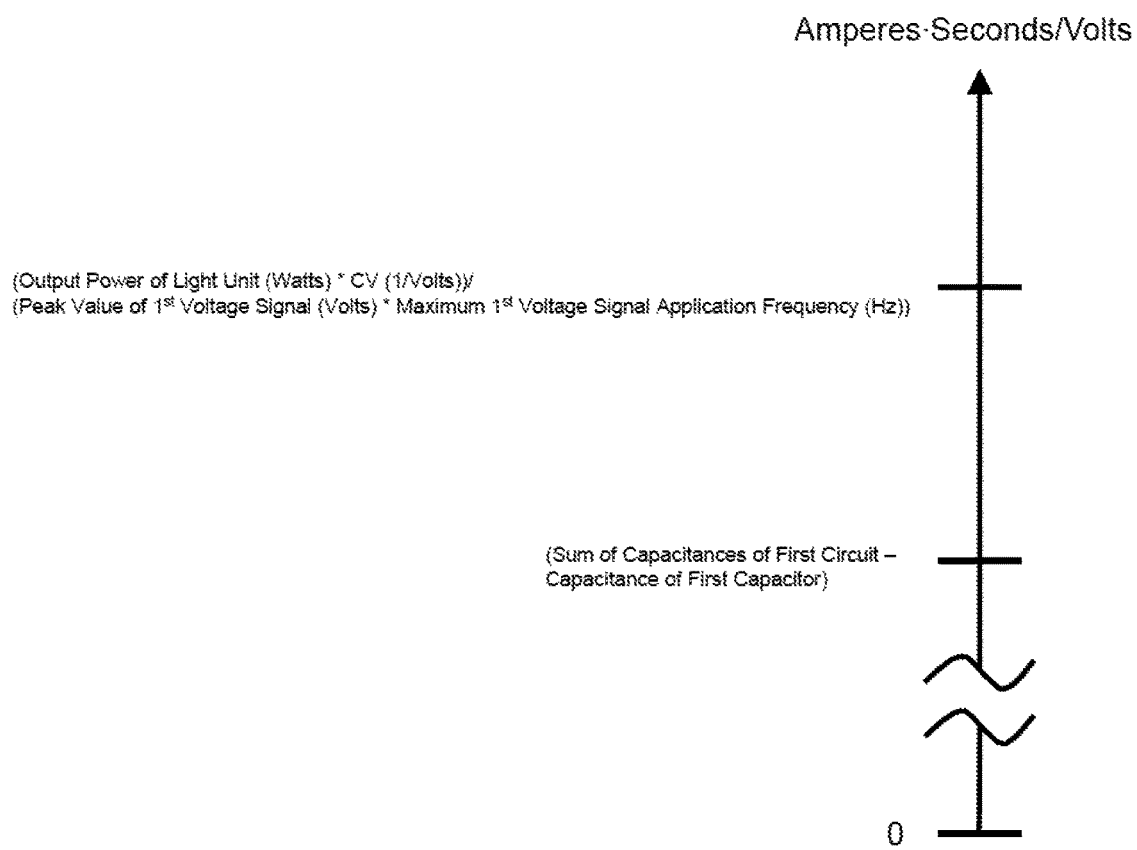
FIG. 13 shows an example of a sum of capacitances (in amperes*seconds/volts) of capacitors of a first circuit, a capacitance of a first capacitor not included being no greater than: (1) an output power (in Watts) of a light circuit multiplied by a constant value (CV) (in 1/volts), divided by (2) a multiplication of a peak value of a first voltage signal (in Volts) and a maximum first voltage signal application frequency (in Hertz).

According to the invention the configuration may be further optimized with the sum of the capacitances (in As/V) of the capacitors of the first circuit (the capacitance of the first capacitor 15 not included) being approximately equal to or smaller than the output power (in W) of the light circuit multiplied by a constant value (CV) and divided by the multiplication of the peak value of the first voltage signal (in V) and the maximum first voltage signal application frequency (Hz). Surprisingly, it was determined that with the constant value (CV) (in 1/V) selected in the range of 0.001 to 0.100 the performance of the lighting device was considerable improved. With the constant value (CV) in the range of 0.003 to 0.03 a further optimization may be obtained and the best performance was perceived at a constant value of approximately 0.01 (see FIG. 13).

Figure 12:
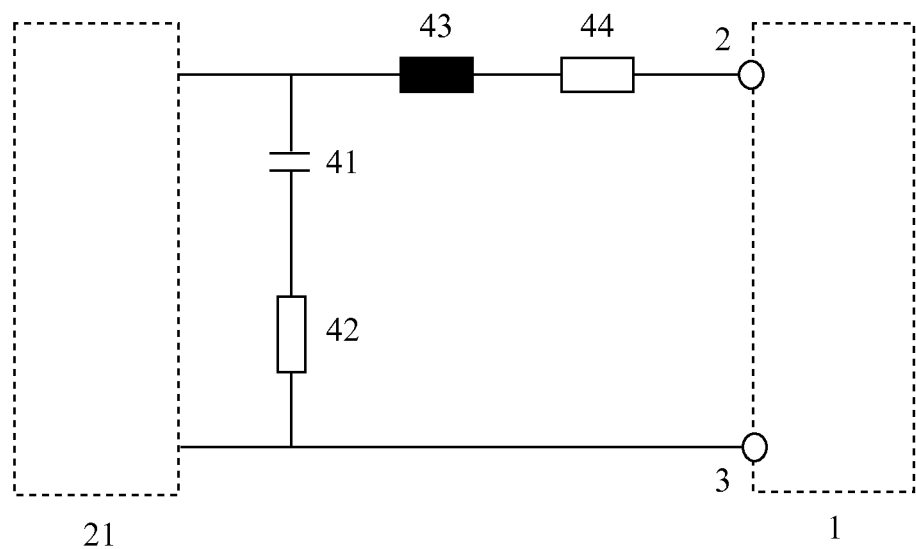
FIG. 12 shows an embodiment of a third circuit.

In FIG. 12, an embodiment of a third circuit 41-42 for improving compatibility to the voltage source 21 is shown. The third circuit 41-42 for example comprises a serial connection of a capacitor 41 and a resistor 42 located between the voltage source 21 and the first circuit 1 and coupled to output terminals of the voltage source 21 (and to the input terminals 2, 3 of the rectifier circuit 1). Alternatively, the third circuit 41-42 may form part of the first circuit 1. Possibly, an inductor 43 and/or a resistor 44 as shown may be added to the third circuit 41-44 for coupling one side of the serial connection to the input terminal 2, with the other side of the serial connection being coupled to the input terminal 3 more directly.

Compatibility is improved owing to the fact that (a) the third circuit 41-42 may change a phase of an output current signal of the first circuit 21 (self-oscillating transformers require two conditions in order to start up and keep oscillating, namely a particular phase and a particular amplitude of this output current signal) and/or (b) the third circuit 41-42 may affect the amplitude of this output current signal (for high frequencies the third circuit 41-42 is a low impedance path which will load the voltage source 21 such that the amplitude of the output current signal will be larger and an oscillation condition is improved) and/or (c) the third circuit 41-42 may provide a low impedance path during the switching of the voltage source 21 (at the edges), here for example in the form of an electronic transformer. The third circuit 41-42 may improve the compatibility to the voltage source 21 independently of the presence of the capacitors 16-18. To improve the compatibility to a particular voltage source 21, the capacitor 41 may have a value of 4.7 nF and the resistor 42 has a value of 10 Ohm (for the inductor 43 having a value of 2.2 µH), but other values are not to be excluded, and for other kinds of voltage source 21 other values may be needed.

Summarizing, first circuits 1 comprise voltage source circuits 21 such as voltage-to-voltage converters. The diode circuits comprise diodes 11-14 for rectifying the first voltage signals and are coupled to output terminals 4, 5 for supplying second voltage signals. First capacitors 15 are coupled to the output terminals 4, 5 for buffering the second voltage signals and for offering buffered second voltage signals to second circuits 22 such as voltage-to-current converts for feeding light circuits 30 comprising one or more light emitting diodes. Additional capacitors 16, 17, 53, 54 are provide in the first circuit and provide a charge-pump effect and improve performances of the first and second circuits 21, 22 and the light circuits 30.

It will be clear from the above that by adding even more charge-pump capacitors further multiplication (quintupler, sextupler etc.) may be achieved.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A lighting device configured to receive a first voltage signal from a voltage source, the lighting device comprising:
    a first circuit coupled to input terminals for receiving the first voltage signal from the voltage source, the first circuit comprising rectifying diodes for rectifying the first voltage signal and supplying a second voltage signal, a first capacitor for buffering the second voltage signal, and a second capacitor coupled in parallel to one of the rectifying diodes of the first circuit;
    a second circuit receiving an input voltage signal, corresponding to the second voltage signal, and converting the input voltage into an output signal; and
    a light circuit receiving the output signal of the second circuit and comprising at least one light emitting diode,
    wherein the first circuit further comprises a fourth circuit provided parallel to the second capacitor, the fourth circuit comprising at least two fourth circuit diodes additional to the rectifying diodes and being connected by a fourth capacitor to one of the input terminals.

2. The lighting device of claim 1, a first input terminal of the input terminals being coupled via a first rectifying diode among the rectifying diodes to a first output terminal of output terminals and further being coupled via a second rectifying diode among the rectifying diodes to a second output terminal of the output terminals, and a second input terminal of the input terminals being coupled via a third rectifying diode among the rectifying diodes to the first output terminal and further being coupled via a fourth diode among the rectifying diodes to the second output terminal.

3. The lighting device of claim 1, further comprising a third capacitor connected directly in parallel with only another one of the rectifying diodes.

4. The lighting device of claim 3, the first circuit comprising a fifth circuit connected in parallel to the third capacitor, the fifth circuit comprising at least two fifth circuit diodes and being connected by a fifth capacitor to another one of the input terminals.

5. The lighting device of claim 1, wherein the buffered second voltage is no greater than 130% of a peak value of the first voltage signal.

6. The lighting device of claim 1, wherein a sum of capacitances (in amperes*seconds/volts) of the capacitors of the first circuit, a capacitance of the first capacitor not included, is no greater than: (1) an output power (in Watts) of the light circuit multiplied by a constant value (CV) (in 1/volts), divided by (2) the multiplication of a peak value of the first voltage signal (in Volts) and a maximum first voltage signal application frequency (in Hertz).

7. The lighting device of claim 6, wherein the constant value (CV) is in a range of 0.001 to 0.100.

8. The lighting device of claim 1, wherein the input voltage signal is an input DC voltage signal and the output signal is an output DC signal, the second circuit being a converter for converting the input DC voltage signal into the output DC signal.

9. The lighting device of claim 8, wherein the output DC signal is an output DC current signal for supplying current to the light circuit comprising at least one light emitting diode, wherein the second circuit is configured to measure an amplitude of the output DC current signal.

10. The lighting device of claim 6, wherein the constant value (CV) is in the range of 0.003 to 0.03.

11. The lighting device of claim 6, wherein the constant value (CV) is approximately 0.01.

12. An apparatus, comprising:
a pair of input terminals configured to receive a first voltage signal from a voltage source; and
a first circuit coupled to the input terminals, the first circuit comprising:
rectifying diodes configured to rectify the first voltage signal and supply a second voltage signal,
a first capacitor connected across an output of the first circuit and configured to buffer the second voltage signal,
a second capacitor connected directly in parallel to exactly one of the rectifying diodes of the first circuit,
a parallel circuit comprising two parallel circuit diodes connected in parallel across the second capacitor, and
a third capacitor connecting the parallel circuit to one of the input terminals.

13. The apparatus of claim 12, further comprising:
a second circuit configured to receive an input voltage signal, corresponding to the second voltage signal, and converting the input voltage into an output signal; and
a light circuit receiving the output signal of the second circuit and comprising at least one light emitting diode.

14. The apparatus of claim 12, wherein the first circuit further comprises a fourth capacitor connected directly in parallel to exactly another one of the rectifying diodes of the first circuit.

15. The apparatus of claim 14, wherein the first circuit further comprises:
a second parallel circuit comprising two second parallel circuit diodes connected in parallel across the fourth capacitor, and
a fifth capacitor connecting the second parallel circuit is to another one of the input terminals.

16. The apparatus of claim 12, further comprising a coupling circuit configured to couple an output of the voltage source to the input terminals, the coupling circuit including a series combination of a coupling resistor and a coupling capacitor connected across the output of the voltage source.

17. The apparatus of claim 16, wherein the coupling circuit further comprises a series combination of a second coupling resistor and a coupling inductor connected in series between an output terminal of the voltage source and one of the input terminals.

18. An apparatus, comprising:
a pair of input terminals configured to receive a first voltage signal from a voltage source; and
a first circuit coupled to the input terminals, the first circuit comprising:
rectifying diodes configured to rectify the first voltage signal and supply a second voltage signal,
a first capacitor connected across an output of the first circuit and configured to buffer the second voltage signal,
a parallel circuit comprising a second capacitor and an additional diode connected in series with each other, the parallel circuit being connected directly in parallel to exactly one of the rectifying diodes of the first circuit.

19. The apparatus of claim 18, further comprising a further diode connected between a first one of the input terminals and a node between the second capacitor and the additional diode.

20. The apparatus of claim 18, further comprising a third capacitor connected between the first one of the input terminals and an output terminal of the first circuit.

* * * * *